(12) United States Patent
Revak

(10) Patent No.: US 11,515,692 B2
(45) Date of Patent: Nov. 29, 2022

(54) WIRE STRIPPING ASSEMBLY

(71) Applicant: Steve Revak, Easton, PA (US)

(72) Inventor: Steve Revak, Easton, PA (US)

( * ) Notice: Subject to any disclaimer, the term of this patent is extended or adjusted under 35 U.S.C. 154(b) by 401 days.

(21) Appl. No.: 16/788,437

(22) Filed: Feb. 12, 2020

(65) Prior Publication Data
US 2021/0249847 A1   Aug. 12, 2021

(51) Int. Cl.
*H02G 1/12*   (2006.01)

(52) U.S. Cl.
CPC ................... *H02G 1/1212* (2013.01)

(58) Field of Classification Search
CPC .................................................. H02G 1/1212
USPC ........................................................... 81/9.44
See application file for complete search history.

(56) References Cited

U.S. PATENT DOCUMENTS

| | | | |
|---|---|---|---|
| 1,354,363 A | | 9/1920 | Aaron |
| 4,341,134 A | * | 7/1982 | Yamazaki ............ H02G 1/1212 81/9.41 |
| D327,826 S | | 7/1992 | Neff |
| 6,192,588 B1 | | 2/2001 | Krampe |
| 6,934,991 B2 | | 8/2005 | Kinkade |
| 9,472,927 B2 | | 10/2016 | Satern |
| 10,700,500 B2 | * | 6/2020 | Murg .................... H02G 1/1295 |
| 11,303,083 B2 | * | 4/2022 | Wollert .............. H01R 43/0421 |
| 2015/0188272 A1 | | 7/2015 | Esterkin |
| 2016/0036206 A1 | | 2/2016 | Zhang |

\* cited by examiner

*Primary Examiner* — Omar Flores Sanchez

(57) ABSTRACT

A wire stripping assembly includes a pair of pliers including a pair of handles and a pair of jaws. Each of the jaws has a plurality of cutting slots integrated therein. The cutting slots in each of the jaws forms a hole when the jaws are closed for having a wire positioned therein. The hole formed by each of the cutting slots has a unique diameter with respect to each other. In this way the hole formed by each of the pairs of cutting slots can accommodate a unique gauge of wire with respect to each other. The cutting slots in each of the jaws is positioned on a leading edge of the jaws thereby facilitating the pair of pliers to be pulled toward a user when the user is stripping the insulation from the wire.

6 Claims, 3 Drawing Sheets

WIRE STRIPPING ASSEMBLY

CROSS-REFERENCE TO RELATED APPLICATIONS

Not Applicable

(c) STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to stripping devices and more particularly pertains to a new stripping device for stripping insulation from a wire.

(2) Description of Related Art Including Information Disclosed Under 37 CFR 1.97 and 1.98

The prior art relates to stripping devices.

BRIEF SUMMARY OF THE INVENTION

An embodiment of the disclosure meets the needs presented above by generally comprising a pair of pliers including a pair of handles and a pair of jaws. Each of the jaws has a plurality of cutting slots integrated therein. The cutting slots in each of the jaws forms a hole when the jaws are closed for having a wire positioned therein. The hole formed by each of the cutting slots has a unique diameter with respect to each other. In this way the hole formed by each of the pairs of cutting slots can accommodate a unique gauge of wire with respect to each other. The cutting slots in each of the jaws is positioned on a leading edge of the jaws thereby facilitating the pair of pliers to be pulled toward a user when the user is stripping the insulation from the wire.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
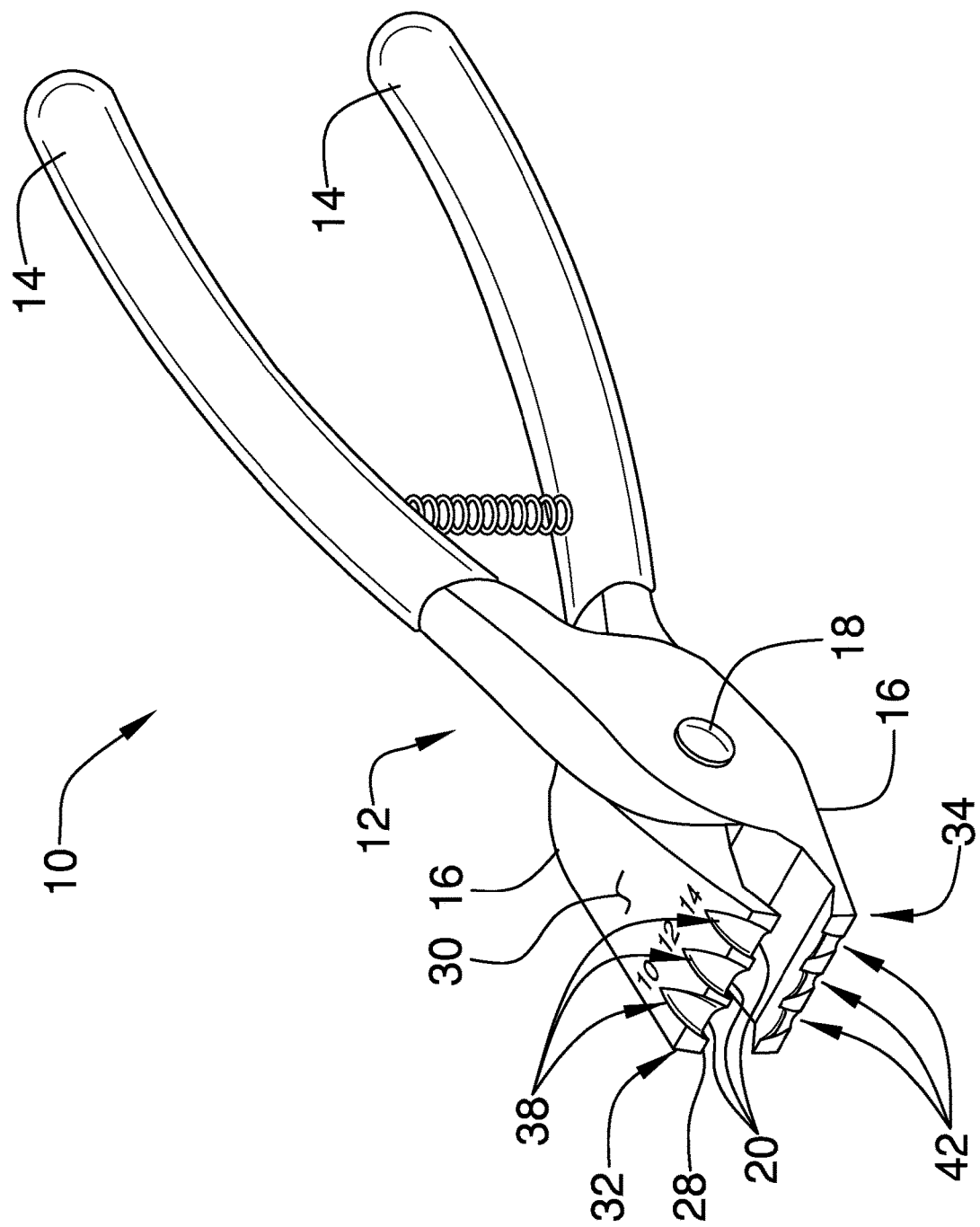
FIG. 1 is a front perspective view of a wire stripping assembly according to an embodiment of the disclosure.
Figure 2:
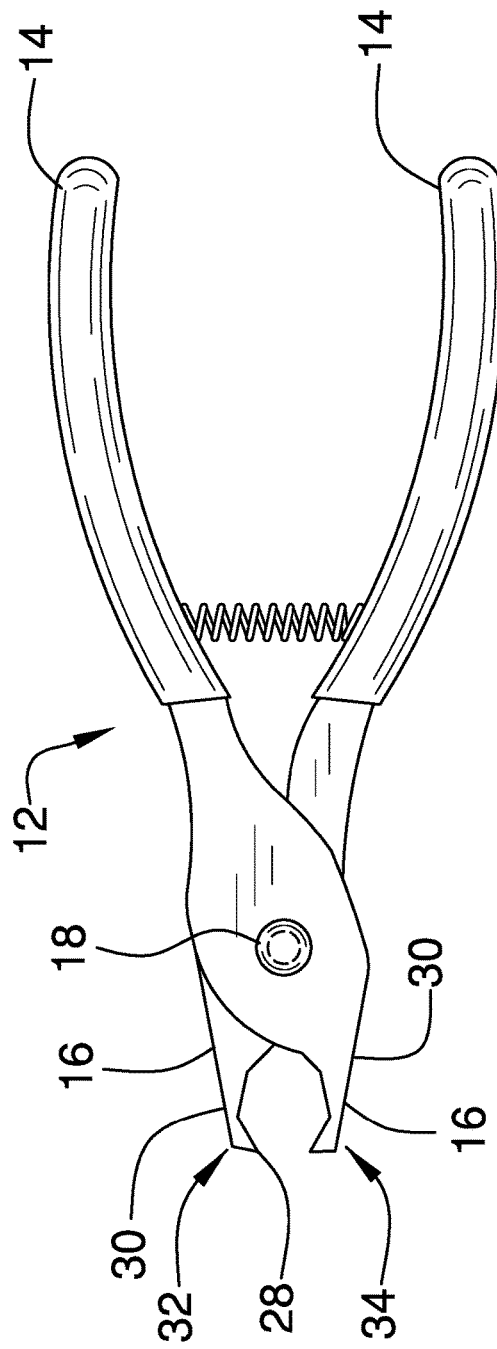
FIG. 2 is a left side view of an embodiment of the disclosure.
Figure 3:
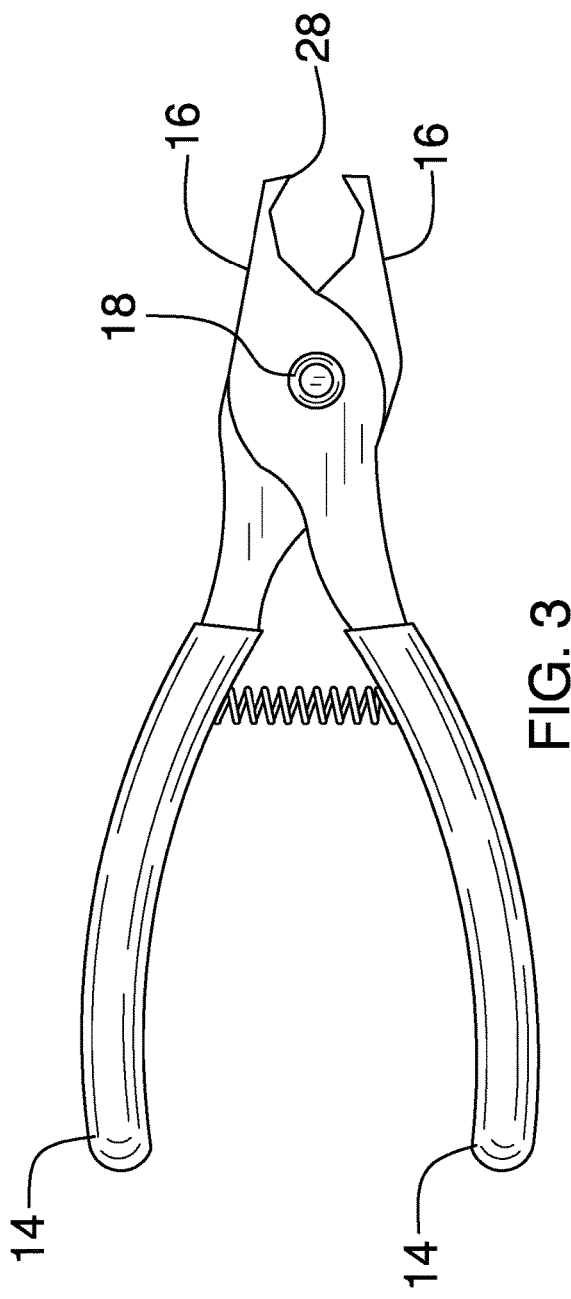
FIG. 3 is a right side view of an embodiment of the disclosure.
Figure 4:
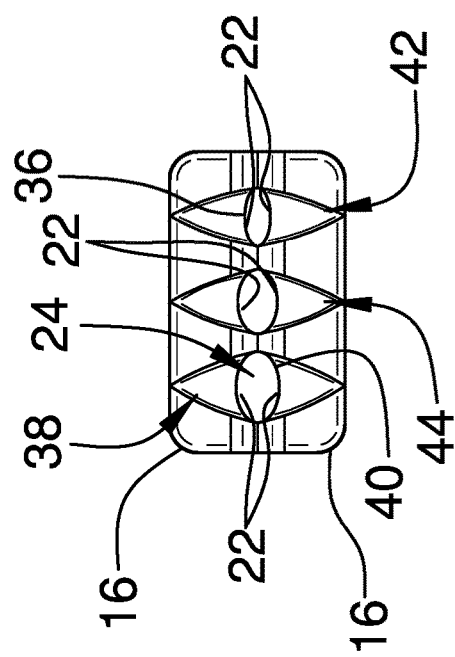
FIG. 4 is a front view of an embodiment of the disclosure.
Figure 5:
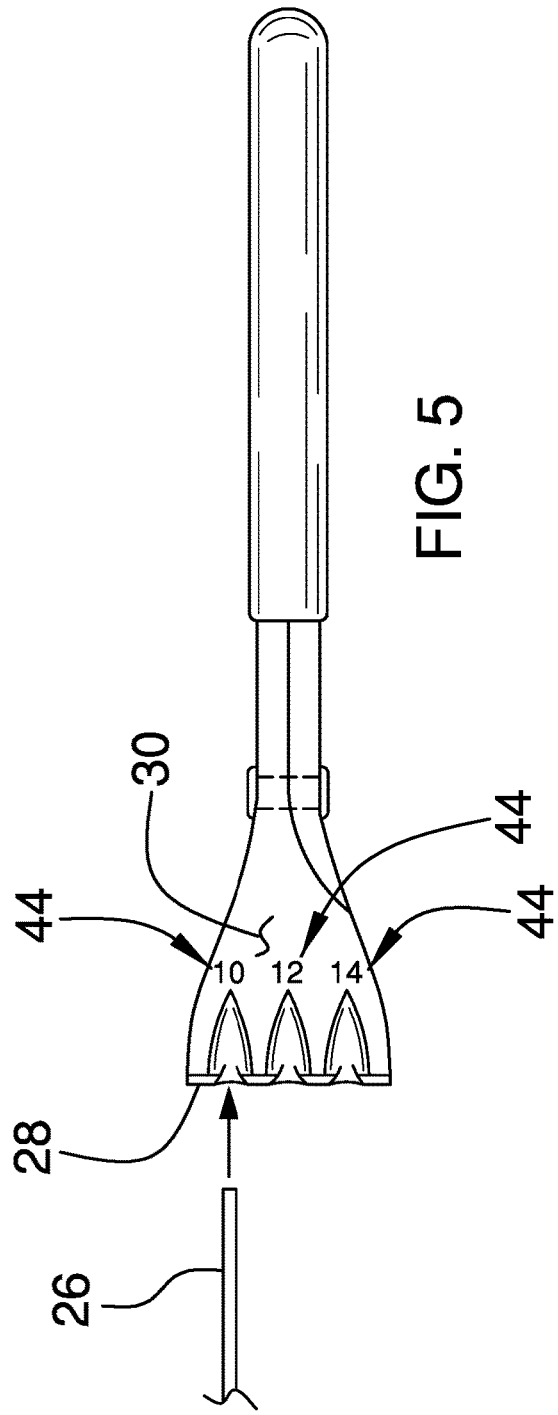
FIG. 5 is a top view of an embodiment of the disclosure.

With reference now to the drawings, and in particular to FIGS. 1 through 5 thereof, a new stripping device embodying the principles and concepts of an embodiment of the disclosure and generally designated by the reference numeral 10 will be described.

As best illustrated in FIGS. 1 through 5, the wire stripping assembly 10 generally comprises a pair of pliers 12 that includes a pair of handles 14 and a pair of jaws 16. The pair of handles 14 are pivotally coupled together at a pivot point 18. Additionally, the handles 14 are biased apart from each other such that the pliers 12 are normally opened. Each of the jaws 16 is urgeable together when the pliers 12 are closed.

Each of the jaws 16 has a plurality of cutting slots 20 that are integrated therein. The cutting slots 20 in each of the jaws 16 are arranged into a plurality of pairs of cutting slots 22. Each of the pairs of cutting slots 22 is aligned with each other. Thus, each of the pairs of cutting slots 22 forms a hole 24 when the jaws 16 are closed. In this way a wire 26, such as an insulated electrical conductor, can be positioned in a corresponding hole 24. The hole 24 formed by each of the cutting slots 20 has a unique diameter with respect to each other. Thus, the hole 24 formed by each of the pairs of cutting slots 22 can accommodate a unique gauge of wire 26 with respect to each other.

Each of the cutting slots 20 is sharpened for cutting insulation on the wire 26. Additionally, the cutting slots 20 in each of the jaws 16 are positioned on a leading edge 28 of the jaws 16. In this way the pair of pliers 12 can be pulled toward a user when the user is stripping the insulation from the wire 26. Thus, the pliers 12 enhance ergonomics as compared to stripping wire 26 with conventional wire 26 strippers that require side to side motion with respect to the user. Each of the jaws 16 is curved between the leading edge 28 and the pivot point 18 such that the leading edge 28 of each of the jaws 16 is directed toward each other. Each of the jaws 16 has an outwardly facing surface 30 with respect to each other. The pair of jaws 16 includes a first jaw 32 and a second jaw 34.

Each of the cutting slots 20 in the first jaw 32 extends from the leading edge 28 of the first jaw 32 toward the pivot point 18. Each of the cutting slots 20 on the first jaw 32 has a bounding edge 36. Moreover, the bounding edge 36 of each of the cutting slots 20 on the first jaw 32 is convexly arcuate with respect the leading edge 28 of the first jaw 32. The cutting slots 20 on the first jaw 32 are spaced apart from each other and are distributed along the leading edge 28 of the first jaw 32. Additionally, the bounding edge 36 of each of the cutting slots 20 is sharpened for cutting the insulation on the wire.

The outwardly facing surface 30 of the first jaw 32 has a plurality of depressions 38 each extending therein. Each of the depressions 38 is aligned with a respective one of the cutting slots 20 on the first jaw 32. Additionally, each of the depressions 38 extends from the respective cutting slot 20 toward the pivot point 18.

Each of the cutting slots 20 in the second jaw 34 extends from the leading edge 28 of the second jaw 34 toward the pivot point 18. Each of the cutting slots 20 on the second jaw 34 has a bounding edge 40 and the bounding edge 40 of each of the cutting slots 20 on the second jaw 34 is convexly arcuate with respect the leading edge 28 of the second jaw 34. Additionally, the cutting slots 20 on the second jaw 34 are spaced apart from each other and are distributed along the leading edge 28 of the second jaw 34. The bounding edge 40 of each of the cutting slots 20 in the second jaw 34 is sharpened for cutting the insulation.

The outwardly facing surface 30 of the second jaw 34 has a plurality of depressions 42 each extending inwardly therein. Each of the depressions 42 on the second jaw 34 is aligned with a respective one of the cutting slots 20 on the second jaw 34. Moreover, each of the depressions 42 on the second jaw 34 extends from the respective cutting slot 20 toward the pivot point 18. The outwardly facing surface 30 of the each of the first jaw 32 and the second jaw 34 has indicia 44 printed thereon. The indicia 44 are positioned adjacent to respective ones of the depressions 38, 42 in each of the first jaw and the second jaw. The indicia 44 comprise numbers for indicating the gauge of wire 26 each of the cutting slots 20 is sized for stripping.

In use, the jaws 16 are positioned around the wire 26 to be stripped and the wire 26 is aligned with the cutting slots 20 that correspond to the gauge of the wire 26. The jaws 16 are closed around the wire 26 thereby facilitating the cutting slots 20 to cut the insulation on the wire 26. The pliers 12 are subsequently urged toward the user to remove the cut insulation from the wire 26. In this way the pliers 12 enhance stripping insulation from the wire 26 with respect to existing wire 26 strippers which require a side to side motion. Thus, the user is protected from wrist injury or hand injury that could potentially result from the unnatural side to side motion required with existing wire 26 strippers.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wire stripping assembly being configured to strip insulation from a wire, said assembly comprising:

a pair of pliers including a pair of handles each being pivotally coupled together at a pivot point and a pair of jaws, each of said jaws being urgeable together when said pliers are closed, each of said jaws having a plurality of cutting slots being integrated therein, said cutting slots in each of said jaws being arranged into a plurality of pairs of cutting slots, each of said pairs of cutting slots being aligned with each other, each of said pairs of cutting slots forming a hole when said jaws are closed wherein said hole is configured to have a wire positioned therein, said hole formed by each of the cutting slots having a unique diameter with respect to each other wherein said hole formed by each of said pairs of cutting slots is configured to accommodate a unique gauge of wire with respect to each other, each of said cutting slots being sharpened for cutting insulation on the wire, said cutting slots in each of said jaws being positioned on a leading edge of said jaws thereby facilitating said pair of pliers to be pulled toward a user when the user is stripping the insulation from the wire wherein said pliers are configured to enhance ergonomics with respect to conventional wire strippers;

wherein each of said jaws is curved between said leading edge and said pivot point such that said leading edge of each of said jaws is directed toward each other, each of said jaws having an outwardly facing surface with respect to each other, said outwardly facing surface of each of said pair of jaws being oriented perpendicular to said pair of handles, said pair of jaws includes a first jaw and a second jaw;

said outwardly facing surface of said each of said first jaw and said second jaw having indicia being printed thereon whereby said indicia is configured to be visible while grasping said handles, said indicia comprising numbers for indicating the gauge of wire each of said cutting slots is sized for stripping; and wherein each of said cutting slots in said first jaw extends from said leading edge of said first jaw toward said pivot point, each of said cutting slots on said first jaw having a bounding edge, said bounding edge of each of said cutting slots on said first jaw being convexly arcuate with respect said leading edge of said first jaw.

2. The assembly according to claim 1, wherein said cutting slots on said first jaw are spaced apart from each other and being distributed along said leading edge of said first jaw, said bounding edge of each of said cutting slots being sharpened for cutting the insulation.

3. The assembly according to claim 2, wherein each said outwardly facing surface of said first jaw has a plurality of depressions each extending inwardly therein, each of said depressions being aligned with a respective one of said cutting slots on said first jaw, each of said depressions extending from said respective cutting slot toward said pivot point.

4. A wire stripping assembly being configured to strip insulation from a wire, said assembly comprising:

a pair of pliers including a pair of handles each being pivotally coupled together at a pivot point and a pair of jaws, each of said jaws being urgeable together when said pliers are closed, each of said jaws having a plurality of cutting slots being intergrated therein, said cutting slots in each of said jaws being arranged into a plurality of pairs of cutting slots, each of said pairs of cutting slots being aligned with each other, each of said pairs of cutting slots forming a hole when said jaws are closed wherein said hole is configured to have a wire positioned therein, said hole formed by each of the cutting slots having a unique diameter with respect to each other wherein said hole formed by each of said pairs of cutting slots is configured to accommodate a unique gauge of wore with respect to each other, each of said cutting slots being sharpened for cutting insulation on the wire, said cutting slots in each of said jaws being positioned on a leading edge of said jaws thereby facilitating said pair of pliers to be pulled toward a user when the user is stripping the insulation from the wire wherein said pliers are configured to enhance ergonomics with respect to conventional wire strippers;

wherein each of said jaws is curved between said leading edge and said pivot point such that said leading edge of each said jaws is directed toward each other, each of said jaws having an outwardly facing surface with respect to each other, said outwardly facing surface of each of said pair of jaws being oriented perpendicular to said pair of handles, said pair of jaws includes a first jaw and a second jaw;

said outwardly facing surface of said first jaw and said second jaw having indicia being printed thereon whereby said indicia is configured to be visible while grasping said handles, said indicia comprising numbers for indicating the gauge of wire each of said cutting slots is sized for stripping; and wherein each of said cutting slots in said second jaw extends from said leading edge of said second jaw toward said pivot point, each of said cutting slots on said second jaw having a bounding edge, said bounding edge of each of said cutting slots on said second jaw being convexly arcuate with respect said leading edge of said second jaw.

5. The assembly according to claim 4, wherein said cutting slots on said second jaw are spaced apart from each other and are distributed along said leading edge of said second jaw, said bounding edge of each of said cutting slots in said second jaw being sharpened for cutting the insulation.

6. The assembly according to claim 5, wherein said outwardly facing surface of said second jaw has a plurality of depressions each extending therein, each of said depressions on said second jaw being aligned with a respective one of said cutting slots on said second jaw, each of said depressions on said second jaw extending from said respective cutting slot toward said pivot point.

* * * * *